Dec. 18, 1951 W. SCHMIDT 2,578,845
BEATING WING PROPELLED AIRCRAFT
Filed Jan. 23, 1947 2 SHEETS—SHEET 2
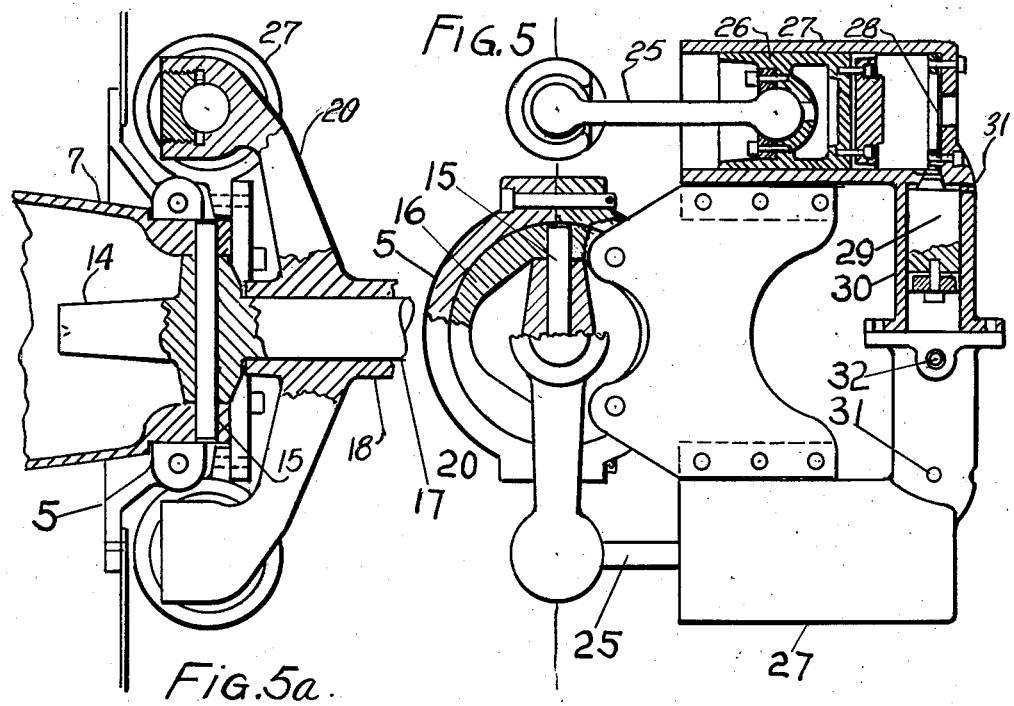
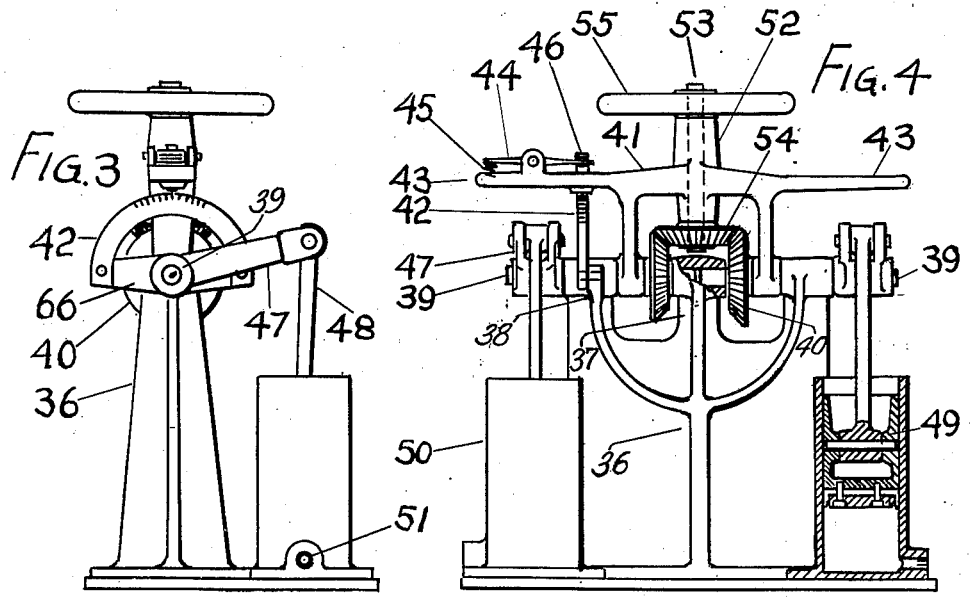
WITNESS
Reginald Schmidt
INVENTOR.
William Schmidt Patented Dec. 18, 1951

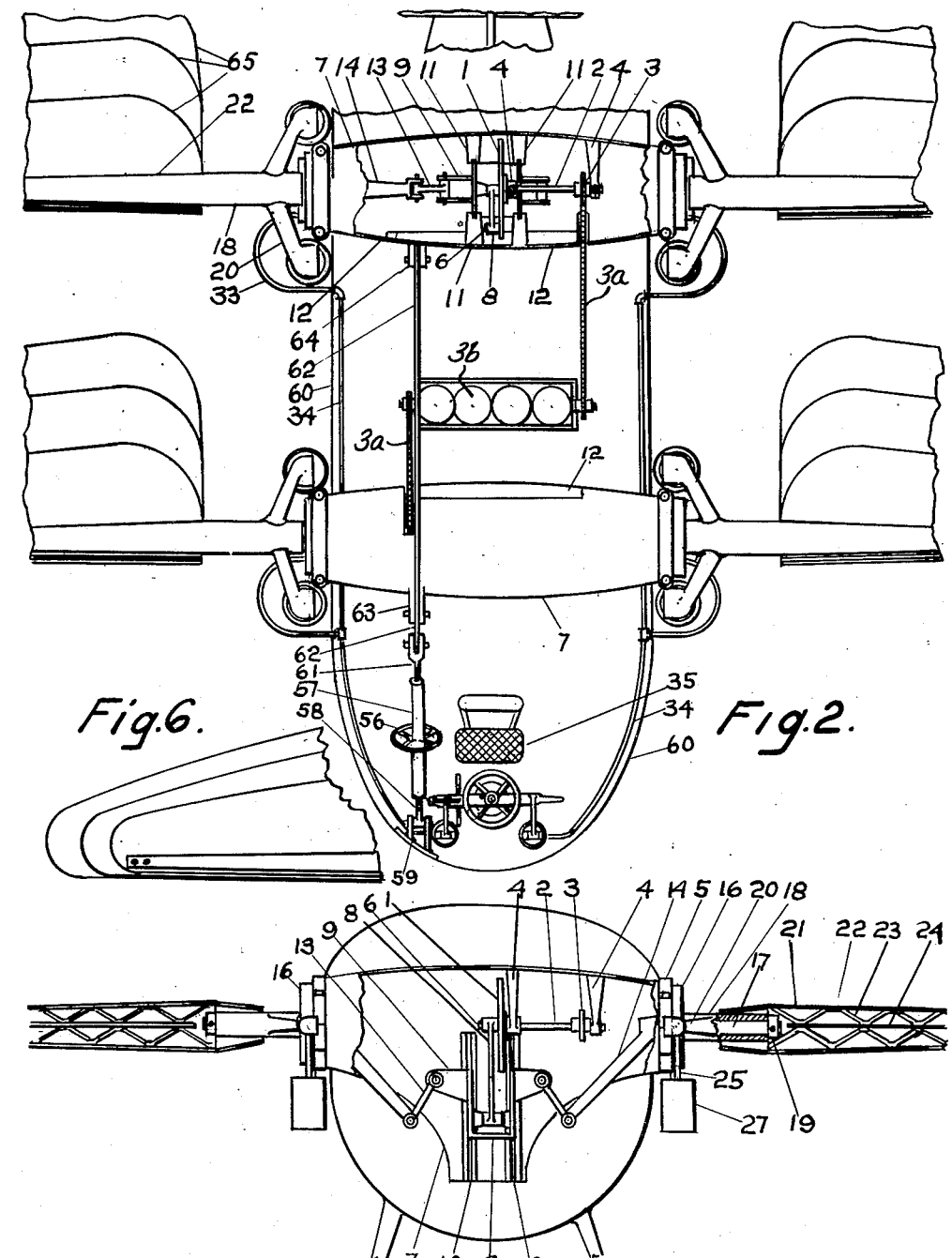

2,578,845

UNITED STATES PATENT OFFICE 2,578,845

BEATING WING PROPELLED AIRCRAFT

William Schmidt, Chicago, Ill.

Application January 23, 1947, Serial No. 723,783

4 Claims. (Cl. 244—72)

1

The invention relates to an aircraft propelled by beating wings that have a natural swing motion at right angles to the beating motion produced automatically by the resistance of the air against the eccentrically held wing blades making self reversing controllable pitch by means of a differential steering device regulating the pitch angle for slow or fast flight, steering sidewise or making curves, the wings being mounted on tilting frames for producing up or downward flying directions.

The invention is illustrated in the accompanying drawings in which

Fig. 1 is a view of the wing beating mechanism.

Fig. 2 is a top view of the general lay out.

Fig. 3 is a side view of the differential steering device.

Fig. 4 is a projection of Fig. 3 the same steering device as seen from the pilot seat.

Fig. 5 is a side view of the wing cushion cylinders attached to the ends of the trunnions of the wing tilting frame.

Fig. 5a is a projection of Fig. 5.

Fig. 6 is the tip end of a wing.

With reference to the drawings the essential parts are numerated and described as follows:

The secret of beating wing flight is the self reversing pitch.

The wing motion of this aircraft is natural the same as the wing motion of the dragon fly, the wing has two distinct motions the "beat" made by a power driven reciprocator and the "swing" motion made by the resistance of the air against the eccentric held wing blade, said swing motion is an automatic right angle to the beat motion. The swing motion is very powerful since it makes and reverses the wing pitch.

The wing beat is made by a reciprocator comprising a side crank 1 on one end of a drive shaft 2 which is mounted in two bearings 4 concentric with the axis of the trunnions 16 on the wing tilting frame 7, near the other end of said drive shaft is mounted a sprocket wheel 3 which is linked by a sprocket chain 3a to the crafts motor 3b. A connecting rod 8 on crank pin 6 reciprocates a U-shaped crosshead 9 which slides in four grooves 10 cut in the ends of four rails 11, two of said rails are integral with the tilting frame 7 and the other two rails are integral with the tilting frame cover 12. The cross-head 9 has hinge brackets on two opposite sides for links 13 transferring motion to oscillate bellcranks 14 which are pivoted on pins 15 located in the trunnion ends 16 of the tilting frame 7 tiltable mounted in bearings 5 one on each side of the fuselage 60. The

2 free ends of the bellcranks 14 form stub shafts 17 for the quill bearings 18 of the cantilever wing arm 22, the quill bearing 18 is retained on the stub shaft 17 by a threaded nut and pin 19. The quill bearing casting 18 is integral with two opposite placed bellcranks 20 on one end, the other end is attached to two opposite placed girder flanges 21 held apart by two rows of lattice spreaders with an eccentric held wing blade 24 sandwiched between them riveted to each other and the girder flanges 21, the latter acting as auxiliary wing blades on account of the air passing through the lattice spreaders of the girder wing arm, said wing blade is stiffened against bending side wise and length wise by smaller blades 65 riveted against the top and the lower side of the center blade.

The bellcranks 20 on the wing arm 22 are operatively linked by universal joint connecting rods 25 to trunk pistons 26 reciprocating in twin cushion cylinders 27, said cushion cylinders joint together by flanges on auxiliary cylinders 30 jutting out from the lower extremes of both cushion cylinders, a cushion air outlet valve seat 29a, is located on said cushion cylinders inside of the junction with said auxiliary cylinders, a combination piston and taper valve 29 is pressed by fluid pressure against said cushion air outlet valves, the combination piston and taper valves are slidably held in said auxiliary cylinders one of the latter is connected at a tap hole 32 to a coiled flexible section 33 of a fluid pressure pipe line 34 connecting the wing cushion cylinders on one side of the craft to the compression cylinder 50 on the same side of the craft, the flexible sections 33 of the fluid pressure pipe line allow for bending when the wings are tilted for upward flight, on the lower extremes of said cushion cylinders is a diaphragm suction air intake valve 28, on the suction stroke the cushion cylinders take in full capacity air, on the compression strokes if no cushion air is allowed to escape a hard cushion is formed causing a flat pitch angle for fast flight, if cushion air is allowed to escape soft cushions will result making steep pitch angles for slow flight, if the steering device Fig. 4, directs high fluid pressure to one side of the craft and low fluid pressure to the other side, the craft will turn to the side that has the low fluid pressure.

A differential steering device Fig. 4 is located in front of the pilot seat 35, the details of said steering device are a frame and base casting 36 having side bearings 38 one on each side of said frame and a central bearing 37 in the middle, all three bearings in conjunction mounting two similar drive shafts 39 butting together endwise in said central bearing, two similar bevel gears 40 are mounted one on each of said drive shafts, said bevel gears face each other across the central bearing 37. A bail 41 straddles said bevel gears and the central bearing between them and hinges with its quill bearings on the two drive shafts 39. The left side bearing 38 is provided with two opposite brackets 66 suspending a notched segment 42 clearing the left bail handle 43, which is equipped with a lock bolt 46 engaging the notches in said segment 42 holding said bail in a fixed position, said lock bolt is a member of a spring operated trap hinge mounted on the left bail handle 43, said trap comprising a coil spring 45 pressing against one arm of a hinged lever 44, the other arm of said lever engaging a lock bolt 46 pushing it in engagement with said notched segment 42, hand pressure on the spring end of said trap will lift the lock bolt on the other end and allow the bail to be swung, causing equal fluid pressure changes in both compression cylinders 50. Locking the bail 41 and turning the steering wheel will cause one drive shaft 39 to turn in one direction and the other in the opposite direction producing a higher fluid pressure in one compression cylinder than in the other causing the craft to change its flight direction toward the side of the craft that has the lower fluid pressure on the wing cushion escape valve. On the side end of each drive shaft 39 is attached a bell crank 47 operatively linked to connecting rods 48 which reciprocate trunk pistons 49 one in each fluid compression cylinder 50 one mounted on each side of the frame base casting 36.

Each fluid compression cylinder is connected at tapped hole 51 to an independent fluid pressure pipe line 34 leading to all the cushion cylinders on one side of the craft only.

A wing tilting device is formed by an expandable connecting rod linked to the front end of a connecting bar which is hinged to each of the tandem placed wing tilting frames of the craft for simultaneous tilting of the wings for upward flight.

The expandable connecting rod details are, a hand wheel 66 attached to a steep threaded turn buckle 57 engaging a lower right hand threaded link 58 which is hinged in a bracket 59 on a lower fuselage member, the upper end of said turn buckle engages a left hand threaded link 61 hinged to the front end of a connecting bar 62 which is hinged again to bracket 63 of the front wing tilting frame the rear end of the bar is hinged to bracket 64 on the rear wing tilting frame. Turning the hand wheel of the expandable connecting rod so as to lengthen it will cause the connecting bar to shift backward tilting both wing tilting frames for upward flying direction of the wings.

I claim as new:

1. Means for propulsion of beating wing aircraft comprising power oscillated eccentrically held, beating, wings, each mounted to swing naturally free in a plane at a right angle to the wing beat on the stub shaft end of a power oscillated bell crank, said wing swing motion automatically produced by the resistance of the air against the eccentrically held wing blade causing automatic self reversing wing pitch, said wing comprising a quill bearing casting integral with two bell cranks placed opposite to each other on the quill bearing end next to the fuselage while the other end is attached to two girder flanges placed opposite to each other and kept apart by two rows of lattice spreaders riveted one row to each flange, said rows of lattice spreaders riveted again to each other with said eccentric held wing blade sandwiched between them, this lattice spreader wing arm construction allowing free air passage through the wing arm causing said girder flanges to act as auxiliary wings alongside the main wing blade.

2. Means for propulsion of beating wing aircraft comprising power oscillated beating wings, each mounted to swing naturally free in a plane at a right angle to the wing beat, means for regulating said wing swing motion to make controllable pitch for flying including an air cushion device operated by each wing and remotely controlled by a differential steering device in the front part of the craft, said wing cushion device comprising two opposite placed bell cranks on a wing quill bearing linked to separate twin connecting rods reciprocating twin trunk pistons in twin air compression cylinders producing air cushions limiting the wing swing and the pitch, said cushion cylinders joined to each other by flanges on auxiliary cylinders jutting out from the lower extreme of each twin cushion cylinder, a cushion air escape valve seat located on the side of each cushion cylinder inside of the junction with each auxiliary cylinder, a combination piston valve subjective to variable fluid pressure, slides in each auxiliary cylinder against said cushion air escape valve seat on each cushion cylinder, a vent hole in each auxiliary cylinder wall near said cushion air escape valve seat liberates any spent cushion air, a diaphragm suction air intake valve on the lower extreme of each cushion cylinder allows full capacity suction air intake at each piston stroke, means for reducing the fluid pressure against said combination piston valves allowing cushion air escape causing weaker wing cushions changing the wing pitch.

3. Means for propulsion of beating wing aircraft comprising oscillated beating wings each mounted to swing naturally free in a plane at a right angle to the wing beat, means for controlling the angular wing swing and the pitch including a hydraulic differential steering device located in the front end of the craft operated by the pilot, said steering device comprising a frame and base casting having a side bearing on both extremes and a central bearing in the middle, all three bearings in conjunction mounting two similar drive shafts abutting together in the middle of said central bearing, a bevel gear mounted on each of said drive shafts so as to face each other across said central bearing, a bail with two quill bearings swingably mounted on said drive shafts straddling said bevel gears and said central bearing means for locking said bail in a fixed position, a spring lever operated bolt mounted on said bail handle engaging notches on the contour of a segment attached to said left side bearing, a steering shaft mounted in the middle of said bail, a steering wheel attached to the upper end of said steering shaft the latter mounted at right angles to the quill bearings of said swingable bail, a bevel gear attached to the lower end of said steering shaft, said bevel gear being in mesh with two other bevel gears each attached to a separate drive shaft in opposite rotation to each other when the steering wheel is turned but said drive shafts turn in unison when said bail is swung, a bell crank attached to each outside end of said drive shafts, each bell crank operatively linked to a connecting rod each reciprocating a trunk piston in a fluid compression cylinder the latter located one on each side of the differential steering device, each one of said fluid compression cylinders serving one fluid pressure pipe line leading to the wing cushion devices on one side of the craft regulating the wing pitch.

4. Means for propulsion of beating wing aircraft comprising oscillated beating wings each swinging naturally free in a plane at a right angle to the wing beat, each wing being carried by a wing tilting frame, a trunnion on each end of said frame, a bellcrank mounted on each trunnion and having a stub shaft end, each said wing tilting frame comprising a housing having a trunnion on each end mounted in bearings opposite to each other one on each side of the fuselage, said tilting frames mounted parallel one behind the other, a connecting bar linked to hinge brackets on each tilting frame for simultaneous tilting of the latter, the front end of said connecting bar hinged to an expandable connecting rod leading angularly downward hinged with the lower end to a hinge bracket on a lower member of the fuselage, said expandable connecting rod comprising a hand wheel attached to a turn buckle threaded to a right hand threaded link member on one end and a left hand threaded link member on the other end, a power driven reciprocator including a drive shaft for oscillating the wings mounted in the middle of said tilting frame, the drive shaft of said reciprocator mounted concentric with the trunnion axis of said tilting frame for keeping a fixed distance to the motor axis when said tilting frame is turned.

WILLIAM SCHMIDT.

REFERENCES CITED

The following references are of record in the file of this patent:

UNITED STATES PATENTS

| Number | Name | Date |
|---|---|---|
| 1,298,773 | Nesbit | Apr. 1, 1919 |
| 1,511,946 | Clarke | Oct. 14, 1924 |
| 1,564,469 | Cosey | Dec. 8, 1925 |
| 1,737,963 | Escobedo | Dec. 3, 1929 |
| 1,777,652 | Potts | Oct. 7, 1930 |

FOREIGN PATENTS

| Number | Country | Date |
|---|---|---|
| 20,952 | Great Britain | of 1906 |
| 342,339 | Great Britain | Jan. 28, 1931 |